US006954660B2

(12) United States Patent
Aoyama

(10) Patent No.: US 6,954,660 B2
(45) Date of Patent: Oct. 11, 2005

(54) DATA DEVICE FOR CELLULAR TELEPHONE AND DATA BACKUP METHOD

(76) Inventor: Shinji Aoyama, 801, Oshikiri 9-1, Ichikawa-shi, Chiba-ken (JP)

( * ) Notice: Subject to any disclaimer, the term of this patent is extended or adjusted under 35 U.S.C. 154(b) by 601 days.

(21) Appl. No.: 09/980,743

(22) PCT Filed: May 29, 2001

(86) PCT No.: PCT/JP01/02684

§ 371 (c)(1),
(2), (4) Date: Nov. 15, 2001

(87) PCT Pub. No.: WO01/76196

PCT Pub. Date: Oct. 11, 2001

(65) Prior Publication Data

US 2002/0155865 A1 Oct. 24, 2002

(30) Foreign Application Priority Data

Mar. 31, 2000 (JP) ...................................... 2000-100009

(51) Int. Cl.[7] ................................................ H04M 1/00
(52) U.S. Cl. ....................................... 455/572; 455/573
(58) Field of Search ................................ 455/572, 573; 709/322; 379/322, 324, 413

(56) References Cited

U.S. PATENT DOCUMENTS 6,249,690 B1 * 6/2001 Mashiko ..................... 455/573

FOREIGN PATENT DOCUMENTS

| | | | |
|---|---|---|---|
| JP | 4-110034 | | 9/1992 |
| JP | 5-55979 | | 3/1993 |
| JP | 5-56131 | | 3/1993 |
| JP | 05-055979 | * | 3/1993 |
| JP | 5-145476 A | | 6/1993 |
| JP | 05-145605 | * | 6/1993 |
| JP | 08-307944 | * | 5/1995 |
| JP | 05-056131 | * | 11/1996 |
| JP | 8-307944 | | 11/1996 |
| JP | 9-224075 | | 8/1997 |
| JP | 10-32631 A | | 2/1998 |
| JP | 10-178745 | * | 6/1998 |
| JP | 11-055384 | | 2/1999 |
| JP | 2000-069144 | * | 3/2000 |
| JP | 2000-188780 | | 7/2000 |
| JP | 2000-312178 | * | 7/2000 |
| JP | 2000-324237 | * | 11/2000 |

* cited by examiner

*Primary Examiner*—Nay Maung
*Assistant Examiner*—Angelica Perez
(74) *Attorney, Agent, or Firm*—Pearne & Gordon LLP

(57) ABSTRACT

A data backup equipment (a charger 12A) has a charging connection terminal (22) to be connected to a charging terminal (20) of a portable telephone (10) and an information transmission connection terminal **(26*a*) to be connected to an external information instrument connection terminal (24*a*). A data backup section (18) automatically reads the data from the portable telephone in association with a charging operation when the portable telephone begins to be charged through the charging terminal (20)**.

11 Claims, 2 Drawing Sheets

DATA DEVICE FOR CELLULAR TELEPHONE AND DATA BACKUP METHOD

DESCRIPTION

A data backup equipment for a portable telephone and a method of backing up data for a portable telephone.

TECHNICAL FIELD

This invention relates to an improvement on an equipment for backing up data such as telephone numbers set and stored in a portable telephone and an improvement on a method of backing up these data.

BACKGROUND OF THE INVENTION

Since such portable telephones as cellular phones, personal handy phones (referred as to "PHS" later) and so on generally have a memory dial function for which the telephone numbers of partners are previously set and stored in the telephones, many users can manage the telephone numbers of the partners using the memory dial function without memorizing the telephone numbers in another memory.

Thus, if the data such as the telephone numbers of the partners happen to be not able to be utilized because of a loss or a failure of the portable telephones or because of a loss of the data due to external causes such as erroneous operation, shocks and so on, the users would suffer great disadvantages.

In addition to the case that the data cannot be utilized, in case that the old portable telephone is replaced by a new portable telephone, it will take much time for the user itself to input the same data as stored in the old telephone into the new telephone. Furthermore, if the data such as the telephone numbers stored in one telephone might be utilized in another telephone, a convenience of the telephones would increase.

In consideration of the aforementioned points, there have been proposed many arts in which the data such as the telephone numbers stored in the portable telephones are stored into external storages such as memory cards. These arts are disclosed in JP55-128955, JP58-58669, JP60-49463, JP61-20464, JP61-43050, JP64-22153, JP2-172355, JP4-302245, JP5-145476, JP9-64959, JP10-32631, JP11-74962 and JU62-112241.

Furthermore, there have been proposed many other arts in which the data such as the telephone numbers are delivered and received through an external information instrument connection terminal of the portable telephone to and from a general information processing equipment called as a mobile gear or a personal computer without using any equipment peculiarly prepared for storing the telephone numbers. These arts are disclosed in JP5-56131, JP5-292172, JP6-46120, JP6-90309, JP6-244986, JP7-111525 and JP8-6902, for example.

However, these prior arts should disadvantageously prepare the equipment peculiarly used for the external storage of the data, but never used in a condition of normally using the portable telephones. Some arts require a special interface or construction for connection of the external storage provided on the side of the telephones. This disadvantageously tends to prevent the arts from being applied to the existing telephones.

There has been proposed an art in which abbreviating dial information is stored in an external storage prepared in a telephone operation station or an exclusive operator without preparing it on the side of the user of the telephone so that other portable telephones can commonly use the abbreviating dial information. This art is disclosed in JP8-307944.

However, since any of the prior arts including the art in which the external storage is provided in the telephone operation station or the like requires the operation which the users themselves memorize such data as the telephone numbers and so on in the external storage, back up them or make an instruction therefor, the operation is much troublesome.

As the result, there occurs a problem in which the data such as the telephone numbers and so on cannot be possibly restored later when the data are erroneously lost because the users don't or forget to back up the data. This is a big trouble in taking into consideration that the backup data are suddenly required in many cases.

This similarly arises in the art in which the data are backed up in the external storage while using the connection terminals for the external information instrument which the portable telephones generally have without providing any interface in those telephones.

There has been provided an art in which the data stored in volatile memories such as RAM, SRAM and so on which are operated in association with the power supply are memorized in the portable telephones as a charger including an external storage rather than the external storage together with the charging operation. This is disclosed in JP5-55979.

This also has occurred such a problem that if the data to be re-memorized in the portable telephones are previously neither stored nor backed up in the external storage, the data cannot be prevented from being lost because the data stored in the peculiarly prepared external storage is just re-memorized together with the charging operation and because the data cannot be stored unless the RAM gets the state of being able to be operated by its energization and therefore the data are just re-memorized after the RAM gets the state of being able to be operated together with the charging operation or after being charged and in addition thereto, the external storage should be provided separately from the portable telephones in preparation for consumption of the battery and brought together with the portable telephones and if otherwise, the data cannot be restored, which causes the troublesome operation to be required.

There has been proposed a charger into which an external storage such as a memory card or the like can be installed as disclosed in JU 4-110034. However, this can only keep the telephone therein, charge it and make the operation to the memory card by using a single equipment and cannot prevent the data from being lost and also requires a special interface, which means that it has the same problems as the other prior arts.

Since any of the aforementioned prior arts have the object of only backing up the data such as the telephone numbers of the parties for operating the telephones to the particular parties, this cannot be coped with when the telephone break down in such a manner as the control information required for the operation of the portable telephones such as the programs peculiar to the telephones required to get the waiting-for state of arrival and dispatch of the telephones is lost by any cause.

In addition thereto, in any of the prior arts, since the setup functions in which the users themselves set personal identification numbers, adjust the arrival sound of the telephones and so on cannot be backed up, the information on these setup functions other than the telephone numbers has to be reinput by the users themselves when the old telephones are replaced by the telephones newly bought, for example, which produces a problem of making the operations troublesome.

The object of the invention is to provide a data backup equipment for a portable telephone and a method of backing up data by using the equipment adapted to be able of being applied to the existing telephones, to prevent the data from being lost without any operation of intentionally backing up the date so that the data can be used as they are and to more easily cope with the break-down of the telephones and the replacement of the telephones.

DISCLOSURE OF THE INVENTION

This invention fundamentally provides a data back up equipment for a portable telephone such as a cellular phone, a personal handy phone, a car telephone, a maritime mobile radiotelephone, a satellite cellular phone machine or the likes comprising a charging section having a charging connection terminal to be connected to a charging terminal of the portable telephone to charge a battery in the portable telephone and a data backup section having an information transmission interface part to be connected to an external information instrument connection interface part of the portable telephone to read and store from the portable telephone data such as telephone numbers and others set and stored through the information transmission interface part in the portable telephone, the data backup section characterized by automatically reading and storing the data stored in the portable telephone therefrom in association with a charging operation when the charging section begins to charge the battery in the portable telephone.

In this manner, as the data stored in the portable telephone is read and stored in the data backup section in association with the charging operation when the portable telephone is charged, which has to be periodically done in the state of its normal use, the telephone numbers and so on can be positively backed up without any intentional backup operation by the users. Thus, the backing up can be done without any troublesome operation and the important data can be prevented from being lost due to a failure to back up the data.

In this case, since the data are backed up through the external information instrument connection interface part that the existing portable telephones generally have, any separate interface is not required for backing up the data whereby the equipment of the invention can be applied to the existing portable telephone. In this sense, what is meant by "the external information instrument connection interface part" of the portable telephone is not the interface part such as the connection terminal exclusively provided for applying the invention thereto, but the flexible connection terminal which the existing portable telephones generally have used for being connected to the external information instrument, an infrared transceiver part (communication part) or the like.

Furthermore, even in case that the portable telephone is used in a normal manner, since the charger inevitably used for the portable telephone backs up the data, the peculiar instrument for backing up the data is not prepared so that any trouble can be saved.

The data backup equipment of the invention may further comprises a feedback section to feed back the data read and stored from the portable telephone by the data backup section through the information transmission interface to the portable telephone to re-memorize the data in the portable telephone.

In this manner, as the data stored by the data backup section can be fed back to the portable telephone, even if the data such as the telephone numbers or others are erroneously lost, the portable telephone can be easily restored to the original condition and therefore in case that the old portable telephone is replaced by the new portable telephone, the data such as the telephone numbers and so on set and used in the former portable telephone can be used without any operation of re-inputting and re-setting the data.

The data to be read and stored from the portable telephone by the data backup section may include at least a control information or a setup function information required for an operation of the portable telephone and a telephone call information such as a telephone number information, an arrival telephone number information, a dispatch telephone number information, a telephone call time, but may be other arbitrary data.

In this manner, as the control information required at least for the operation of the portable telephone such as the program or the like peculiar to the portable telephone for requiring the telephone to wait for the arrival or the dispatch thereof as well as the information such as the telephone numbers input by the user are backed up, even if an obstacle to the control information happens by any cause and the portable telephone breaks down, the control information can be easily restored by the backed up data Similarly, as various setup function information set by the user to set at the predetermined atmosphere a waiting-for state such as an selection of a personal identification number and an arrival sound, an adjustment of an arrival sound volume and a telephone call sound volume, a setup of an answering function or a dial key lock, for example is backed up, even though these data are lost or even though an old telephone is replaced by a new telephone, the backed up data can be used without any trouble operation of the user's re-setting a management information.

In the invention, what is meant by "control information required for the operation of the portable telephone" is the program peculiar to the telephone and required for getting the waiting-for state of the arrival or the dispatch of the telephone, which is required for the minimum function of the telephone and what is meant by "setup function information" is the setup information such as the selection of the personal identification number and the arrival sound, the adjustment of the arrival sound volume and the telephone call sound volume, the setup of the answering function, the dial key lock or the likes, which relate to various functions set by the user for setting the waiting-for state at predetermined atmosphere.

As the arrival telephone numbers (arrival history) and the dispatch telephone numbers (dispatch history) among the telephone call information in addition to the control information, the setup function information and the telephone numbers are also backed up, even though the former data are eliminated because of the telephone call information amount exceeding the memory limit of the portable telephone, the user can have access to and use the eliminated data. Similarly, even though the information fails to be stored at the memory dial (telephone directory), the user can have access to and use the information. Also, as the telephone call time is backed up, it can be used for referring to the use time and the use charge later.

The data backup equipment of the invention may further comprise a data selection section to arbitrarily select and set any of the data to be read and stored from the portable telephone by the data backup section or the date to be fed back to the portable telephone and again stored therein by the feedback section.

In this manner, as the data to be read and stored from the portable telephone can be selected and set, the data that the user doesn't want to update can be set up arbitrarily. Thus, the unintentional update of the data can be prevented and the unnecessary data communications can be omitted.

The data backup equipment of the invention may further comprise a data process section to automatically process the data read from the portable telephone under predetermined conditions whereby the feedback section can feed back to the portable telephone the data processed by the data process section In this manner, as the data read from the portable telephone is adapted to be automatically processed and stored in case that the data have such predetermined conditions as the data are required to be processed, the numbers of the cellular phones and the PHSs which are stored by 10 figures can be converted into the proper numbers of 11 figures and the data which are stored in Kana characters can be converted into the ones in Chinese characters corresponding thereto, for example. Thus, the existing portable telephones can be easily made to upgrade by affording the same function as the newest model to the existing telephones of the old model.

The invention also provides a method of backing up data set and stored in a portable telephone such as a cellular phone, a personal handy phone, a car telephone, a maritime mobile radiotelephone machine, a satellite cellular phone machine or the likes by reading and storing data in an external storage, the method characterized by preparing a charger having a charging connection terminal to be connected to a charging terminal of the portable telephone as the external storage and an information transmission interface part to be connected to an external information instrument connection interface part of the portable telephone and automatically reading the data set and stored in the portable telephone therefrom through the information transmission interface part to store them in the charger in association with a charging operation when the charger begins to charge the battery in the portable telephone through the charging terminal.

The data backup method of the invention may be adapted to further feed back the data read and stored from the portable telephone through the information transmission interface part to the portable telephone to re-memorize the data in the portable telephone.

The data backup method of the invention can read and store from the portable telephone the data of a control or setup function information required at least for an operation of the portable telephone and a telephone call information such as telephone number information, an arrival telephone number information, a dispatch telephone number, a telephone call time or the likes among the data to be read and stored from the portable telephone, but may read and store the other information.

The data backup method of the invention may further arbitrarily select and set any of the data to be read and stored from the portable telephone or the date to be fed back to the portable telephone and again stored therein.

The data backup method of the invention may further automatically process the data read from the portable telephone under predetermined conditions whereby the processed data are fed back to the portable telephone.

BEST MODE OF CARRYING OUT THE INVENTION

Figure 1:
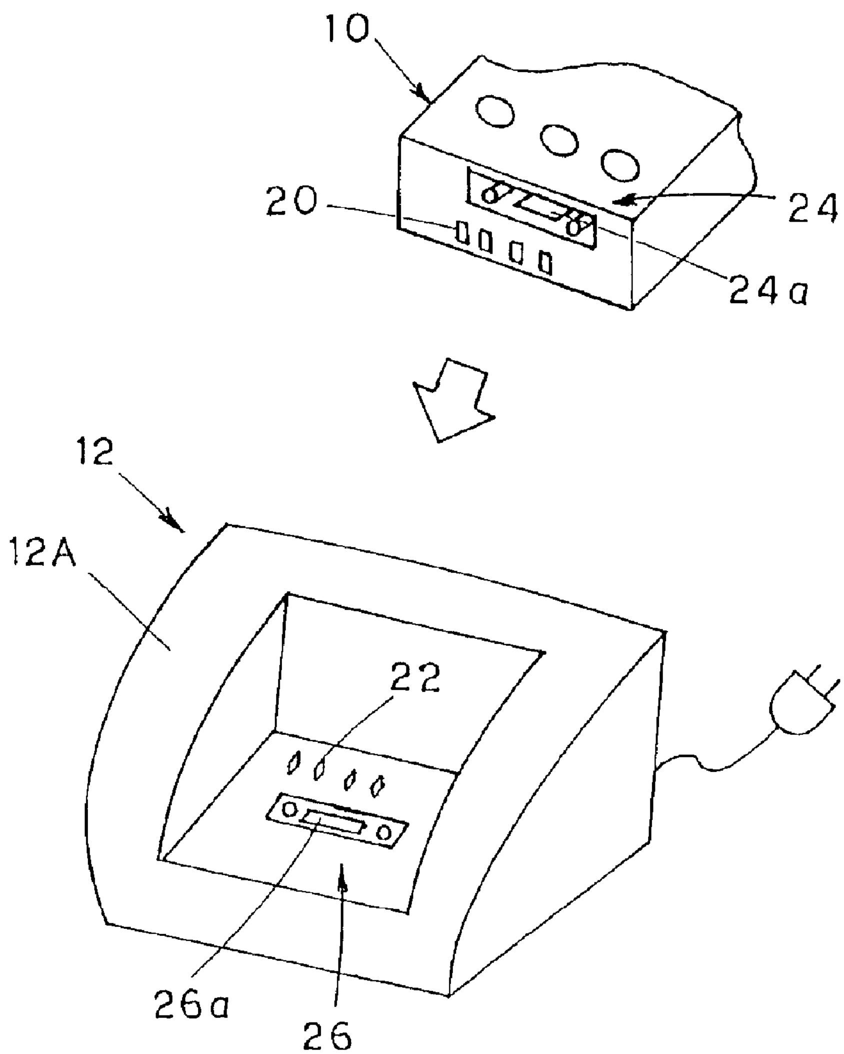
FIG. 1 is a schematic perspective view of a data backup equipment for a portable telephone constructed in accordance with the invention in the state of using the data backup equipment.
Figure 2:
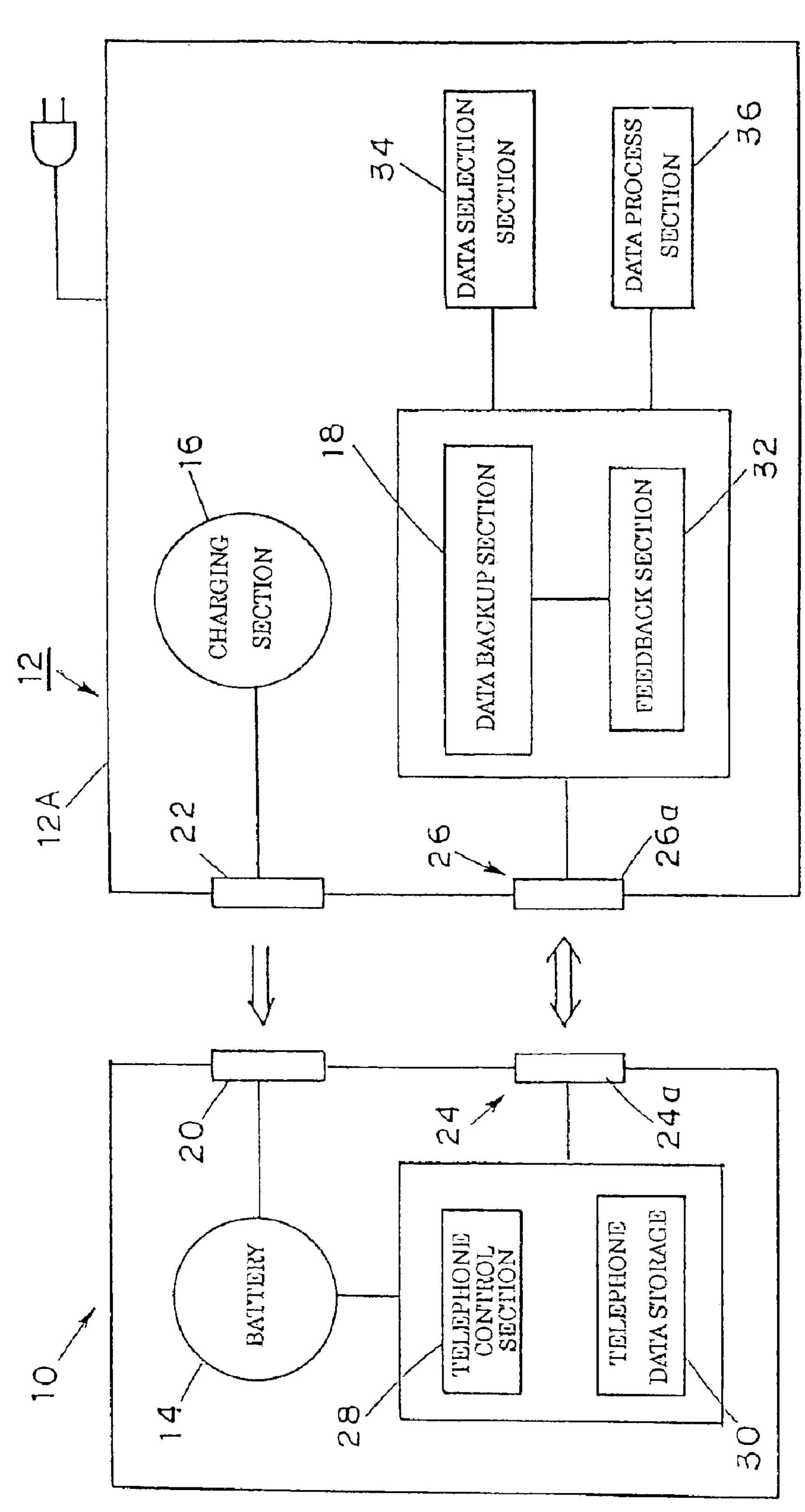
FIG. 2 is a schematic diagram of the data backup equipment of the invention.

Describing a mode of carrying out the invention, FIGS. 1 and 2 illustrate a data backup equipment 12 for a portable telephone 10 constructed in accordance with the invention. In the illustrated embodiment, the data backup equipment 12 of the invention 12 may be in the form of a charger 12A. The portable telephone 10 may be any of a cellular phone, a personal handy phone system (PHS), a car telephone, a maritime mobile radiotelephone machine, a satellite cellular phone machine and so on. Of course, it is not limited to the aforementioned ones and may include mobile communication devices having other functions as long as they have the minimum function of telephone call.

As shown in FIG. 2, the charger 12A which is the data backup equipment of the invention comprises a charging section 16 to charge a battery 14 in the portable telephone 10 and a data backup section 18 to read from the portable telephone 10 the data such as telephone numbers and others set and stored in the portable telephone 10 and store them in the data backup section 18.

As shown in FIGS. 1 and 2, the charging section 16 has a charging connection terminal 22 to be connected to a charging terminal 20 of the portable telephone 10 and serves to charge the battery in the portable telephone 10 through the charging connection terminal 22.

As shown in FIGS. 1 and 2, the data backup section 18 has an information transmission interface part 26 to be connected to an external information instrument connection interface part 24 of the portable telephone 10 and serves to read from the portable telephone 10 through the information transmission interface part 24 the data such as telephone numbers and others set and stored in the portable telephone 10. In the illustrated embodiment, the external information instrument connection interface part 24 of the portable telephone 10 is shown to be in the form of an external information connection terminal **24*a* while the information transmission interface part 24 of the data backup equipment 12 (the charger 12A) may comprise an information transmission connection terminal 26*a* corresponding to the external information instrument connection terminal 24*a***.

More particularly, the information transmission interface part 26 of the charger 12A as the data backup equipment 12 may be set up according to the form of the flexible external information instrument connection interface part 24 which the portable telephone 10 to be backed up generally has for being connected to the external information instrument and therefore the existing portable telephone 10 is not required to have the construction changed. Thus, the information transmission interface part 26 may be in the standardized general form. It will be noted that if the portable telephone 10 as the object of the invention has the infrared transceiver part serving as the external information instrument connection interface part 24, for example, which is different from the illustrated form, then the information transmission interface part 26 of the charger 12A as the data backup equipment 12 may be an infrared transceiver part corresponding to that of the portable telephone 10.

When the charging section 16 of the charger 12A as the data backup equipment 12 begins to charge the battery 14 of the portable telephone 10, the data backup section 18 automatically reads from the portable telephone 10 the data stored in the portable telephone 10 and stores them therein in association with the charging operation.

More particularly, the data backup section 18 is connected to the charging section 16 as shown in FIG. 2 and when the charging section 16 begins to charge the portable telephone 10, the data backup section 18 detects that the charging operation starts and reads and stores the data through the information transmission connection terminal 26*a* from a telephone control section 28 and a telephone data storage 30 where the data to be read by the data backup section 18 are stored.

Thus, as the user of the portable telephone 10 mounts the telephone 10 on the charger 12A for charging the telephone 10 or while the user intends to just charge the telephone 10, the data are backed up together the charging operation of the telephone 10 without any intention of backing up the data.

As shown in FIG. 1, in the charger 12A also serving as the data backup equipment 12, the charging connection terminal 22 and the information transmission connection terminal 26*a* as the information transmission interface part 26 are provided at positions corresponding to the charging terminal 20 of the portable telephone 10 and the external information instrument connection terminals 24*a* of the external information instrument connection interface part 24 generally provided near the charging terminals 20, respectively so that the portable telephone 10 can be properly mounted on the charger. The configurations and the arrangements of the charging terminal 20 of the portable telephone 10 and the external information instrument connection terminal 24*a* are not limited to those shown in FIG. 1, but may be of the configurations and the arrangements different from those shown in FIG. 1. Even though they have any configuration and arrangement, those of the charging connection terminal 22 and the information transmission connection terminal 26*a* of the data backup equipment 12 (the charger 12A) are required to be set corresponding to the charging terminal 20 and the external information instrument connection terminal 24*a* of the portable telephone 10.

In this manner, only by mounting the portable telephone 10 on the charger 12A, the data backup together with the charging operation can be performed. Thus, when the portable telephone 10 is charged, which is required to be periodically done in the ordinary state of use, the data stored in the portable telephone are automatically read and stored in the data backup section 18 in association with the charging operation. As a result, since the telephone numbers and so on can be positively backed up without any operation for the intentional data backup by the user, trouble can be saved and also the important data can be prevented from being lost due to the failure to back up the data. Medium for storing the data read in the data backup section 18 may be of any kind so long as it can properly store the data to be backed up.

Since the data are backed up through the external information instrument connection interface part 24 which the existing portable telephone 10 generally has, the separate interface for data backup is not required and therefore the invention can be easily applied to the existing portable telephone 10. Similarly, since the data are backed up by the charger 12A which is required to be necessarily used even though the portable telephone 10 is used in an ordinary manner, the peculiar instrument for backing up the data is not required, which causes trouble to be saved.

As shown in FIG. 2, the charger 12A which is the data backup equipment 12 of the invention further comprises a feedback section 32 to feed back the data stored in the data backup section 18 in this manner through the information transmission connection instrument 26*a* of the information transmission interface section 26 to the portable telephone 10 to again store the data in the portable telephone 10.

As shown in FIG. 2, the feedback section 32 is connected to the data backup section 18 to read the data stored in the data backup section 18 to transmit the data to the portable telephone 10 by the user's applying a predetermined operation to the charger 12A so as to give a command thereto in case that the data should be fed back by erroneously losing the data in the portable telephone 10, for example.

This can easily restore the telephone to its original condition even though the data such as the telephone numbers or others are erroneously lost and also in case that the old portable telephone is replaced by the new portable telephone, the data such as the telephone numbers and so on set and used in the former portable telephone can be used as they are without any operation of re-inputting and re-setting the data.

In the invention, the data which should be read and stored by the data backup section 18 from the portable telephone 10 may be of any kind so long as they can be read among the various data stored in the portable telephone 10 or may be exclusively the data which can be used as telephone directories for telephone numbers and abbreviated dialing numbers stored by the telephone data storage 30.

However, the data to be backed up may preferably include a control information required at least for operating the portable telephone 10 as well. More particularly, such a control information to be backed up may include a control program peculiar to the telephone and required for getting the waiting-for state of the arrival or the dispatch of the telephone, which is required for the minimum function of the telephone and stored in a non-volatility memory such as ROM, PROM and so on in the telephone control section 28 of the portable telephone 10. In this manner, as the control information is the object of the backup, even if the portable telephone is in the failure state caused by the occurrence of a trouble in the control information due to any cause, the telephone can be easily restored to the original condition by feeding back the backed up data to the portable telephone 10 in a preferable manner.

In this case, although the control information is generally stored in the non-volatility memory in the portable telephone 10, since the data are required to be written for being re-memorized or renewed in the portable telephone 10 by feeding back the data by the feedback section 32, they are required to be stored in the memory like a non-volatility ROM such as EEPROM and a flash memory (flash EEPROM) or a non-volatility RAM such as a NVRAM (RAM and EEPROM), in all of which the data can be electrically written and erased. Thus, the invention can be applied only to the portable telephone 10 in which the data are stored in the write enable memory, but it may be applied to the existing portable telephone 10 having no write enable memory by replacing it by the memory having the control information stored without any big alteration.

In addition thereto, there can be backed up such setup function information as the selection of the personal identification number and the arrival sound, the adjustment of the arrival sound volume and telephone call sound volume, the setup of the answering function or the dial key lock, for example stored in the memories in the telephone control section 28 and the data storage section 30 and set by the user for setting the waiting-for state at predetermined atmosphere. This requires no trouble not only in case that the data are lost, but also in case that the old portable telephone is replaced by the new portable telephone because the backed up data can be used without any operation of re-setting these setup function information data by the user.

In addition to the control information and the setup function information, there may be backed up the telephone call information such as the dispatch telephone number information, the arrival telephone number information, telephone call time or the likes and other arbitrary data stored in the non-volatility memory such as RAM, SRAM and so on in the data storage section 30. Especially, in case that the telephone call information such as the arrival telephone number information (arrival history) and the dispatch telephone number information (dispatch history) are backed up, even though the old or former data happen to be eliminated because the amount of these telephone call information exceeds the limit of the memory, the user can have access to and use them later even though the user fails to write them in the dial directories. By backing up the telephone call time, it can be used for referring to the use time or use charge later.

The data backup equipment 12 (the charger 12A) of the invention may further comprise a data selection section 34 to select and set any of the data to be read and stored from the portable telephone 10 by the data backup section 18 or the date to be fed back and again stored by the feedback section 32 to the portable telephone 10 as shown in FIG. 2.

As aforementioned, the invention can back up the various data set and stored in the portable telephone 10, but the user will not want to back up any data among the various data or to feed back any data among the backed up data. To this end, in the condition that all the data can be read out, the data to be read from the portable telephone can be set so as to be able to be selected whereby the data that the user doesn't want to back up or feed back are never backed up in the charger 12A or in the condition that all the data are backed up in by the data backup section 18, the data to be fed back from the feedback section 32 can be set so as to be able to be selected among all the information backed up in the data backup section 18.

The selection and setup of the data by the data selection section 34 may be done by the user's operating an operation part not shown and provided in the charger 12A. Thus, the data which the user doesn't want to update can be arbitrarily set, the unintentional update of the data can be prevented and the unnecessary data communications can be omitted.

The data backup equipment 12 (the charger 12A) of the invention may further comprise a data process section 36 to automatically process the data read from the portable telephone 10 in case that the data have such predetermined conditions as the data are required to be processed and the feedback section 32 can feed back to the portable telephone 10 the data processed by the data process section 36.

Thus, since the numbers of the cellular phones and the PHSs which are stored by 10 figures (the predetermined condition 1) can be converted into the proper numbers of 11 figures and the data which are stored in Kana characters (the predetermined condition 2) can be converted into the ones in Chinese characters corresponding thereto, for example, the existing portable telephones can be easily made to upgrade by affording the same function as the newest model to the existing telephones of the old model. The predetermined conditions can be manually, electrically or mechanically set and input in the data process section 36 in accordance with the nature thereof.

In accordance with the invention, since the data stored in the portable telephone are read and stored in association with the charging operation when the portable telephone is charged, which has to be periodically done in the state of its normal use, the telephone numbers and so on can be positively backed up without any intentional backup operation by the users. Thus, the backing up can be done without any troublesome operation and the important data can be prevented from being lost due to a failure to back up the data.

In this case, since the data are backed up through the external information instrument connection interface part that the existing portable telephones generally have, any separate interface is not required for backing up the data whereby the invention can be easily applied to the existing portable telephone.

Furthermore, even in case that the portable telephone is used in a ordinary manner, since the charger inevitably used for the telephone backs up the data, the special instrument for backing up the data is not prepared for backing up the data so that any trouble can be saved.

Since the data stored by the data backup section can be fed back to the portable telephone, even if the data such as the telephone numbers or others are erroneously lost, the portable telephone can be easily restored to the original condition and also in case that the old portable telephone is replaced by the new portable telephone, the data such as the telephone numbers and so on set and used in the former portable telephone can be used as they are without any operation of re-inputting and re-setting the data.

Since the control function information required at least for the operation of the portable telephone is backed up, even though the trouble in the control information occurs due to some cause so that the telephone gets the failure state, it can be easily restored to the original condition.

Since the setup function information set by the user to set at the predetermined atmosphere the waiting-for state such as the selection of the personal identification number and the arrival sound, the adjustment of the arrival sound volume and the telephone call sound volume, the setup of the answering function or the dial key lock, for example is backed up, even though the data are lost or even though the old telephone is replaced by the new telephone, the backed up data can be used without any trouble operation of the user's re-setting the management information.

Since the telephone call information such as the arrival telephone number information (arrival history) and the dispatch telephone number information (dispatch history) are backed up, even though the old or former data happen to be eliminated because the amount of these telephone call information exceeds the memory limit of the portable telephone, the user can have access to and use them later even though the user fails to write them in the dial directories. Similarly, by backing up the telephone call time, it can be used for referring to the use time or use charge later.

Since the data to be read and stored from the portable telephone or the data to be fed back to the portable telephone can be selected and set, the data that the user doesn't want to update can be set up arbitrarily, the unintentional update of the data can be prevented and the unnecessary data communications can be omitted.

Since the data read from the portable telephone is adapted to be automatically processed and stored in case that the data have such predetermined conditions as the data are required to be processed, the numbers of the cellular phones and the personal handy phones (PHSs) which are stored by 10 figures can be converted into the proper numbers of 11 figures and the data which are stored in Kana characters can be converted into the ones in Chinese characters corresponding thereto, for example. Thus, the existing portable telephones can be easily made to upgrade by affording the same function as the newest model to the existing telephones of the old model Utilizability for Industries As aforementioned, the data backup equipment and the data backup method of the invention can be applied to the charger, which is inevitably used along with the portable telephone in which the data are set and stored.

What is claimed is:

1. Data backup equipment for a portable telephone such as a cellular phone, a personal handy phone, a car telephone, a maritime mobile radiotelephone machine or a satellite cellular phone machine, comprising a charging section, a data backup section, a data feedback section and a data selection section, said charging section having a charging connection terminal to be connected to a charging terminal of said portable telephone to charge a battery in said portable telephone, said data backup section having an information transmission interface part to be connected to an external information instrument connection interface part of said portable telephone to read and store from said portable telephone data set and stored through said information transmission interface part in said portable telephone, said data backup section automatically reading and storing said data stored in said portable telephone therefrom in association with a charging operation when said charging section begins to charge said battery in said portable telephone, said feedback section feeding back said data read and stored from said portable telephone by said data backup section through said information transmission interface part to said portable telephone to again store said data in said portable telephone, said data to be read and stored from said portable telephone by said data backup section also including control or setup function information required at least for an operation of said portable telephone and a telephone call information such as a telephone number information, an arrival telephone number information, a dispatch telephone number or a telephone call time, said data selection section operating to select and set any of said data to be read and stored from said portable telephone by said data backup section or said data to be fed back and again stored by said feedback section to said portable telephone.

2. Data backup equipment for a portable telephone as set forth in claim 1, further comprising a data process section to automatically process said data read from said portable telephone under predetermined conditions whereby said feedback section feeds back to said portable telephone said data processed by said data process section.

3. A method of backing up data set and stored in a portable telephone such as a cellular phone, a personal handy phone, a car telephone, a maritime mobile radiotelephone machine or a satellite cellular phone machine, by reading and storing said data in an external storage, comprising providing a charger having a charging connection terminal to be connected to a charging terminal of said portable telephone as an external storage and an information transmission interface part to be connected to an external information instrument connection interface part of said portable telephone, automatically reading said data set and stored in said portable telephone through said information transmission interface part to store said data in said charger in association with a charging operation when said charger begins to charge said battery in said portable telephone through said charging terminals, said data to be read and stored including data of a control or setup function information further including at least for an operation of said portable telephone and a telephone call information such as a telephone number information, an arrival telephone number information, a dispatch telephone number or a telephone call time, and arbitrarily selecting and setting any of said data to be read and stored from said portable telephone or said date to be fed back and again stored to said portable telephone, said data to be read and stored in said portable telephone are read and stored from said portable telephone.

4. A method of backing up data for a portable telephone as set forth in claim 3, further comprising the step of feeding back said data read and stored from said portable telephone through said information transmission interface part to said portable telephone to again store said data in said portable telephone.

5. A method of backing up data for a portable telephone as set forth in claim 3, further comprising the step of automatically processing said data read from said portable telephone under predetermined conditions whereby said processed data are fed back to said portable telephone.

6. A method of backing up data for a portable telephone as set forth in claim 4, further comprising the step of automatically processing said data read from said portable telephone under predetermined conditions whereby said processed data are fed back to said portable telephone.

7. Data backup equipment for a portable telephone as set forth in claim 1, further comprising a data selection section to select and set any of said data to be read and stored from said portable telephone by said data backup section or said date to be fed back and again stored by said feedback section to said portable telephone.

8. Data backup equipment for a portable telephone as set forth in claim 1, further comprising a data process section to automatically process said data read from said portable telephone under predetermined conditions whereby said feedback section feeds back to said portable telephone said data processed by said data process section.

9. Data backup equipment for a portable telephone as set forth in claim 1, further comprising a data process section to automatically process said data read from said portable telephone under predetermined conditions whereby said feedback section feeds back to said portable telephone said data processed by said data process section.

10. Data backup equipment for a portable telephone as set forth in claim 7, further comprising a data process section to automatically process said data read from said portable telephone under predetermined conditions whereby said feedback section feeds back to said portable telephone said data processed by said data process section.

11. A method of backing up data for a portable telephone as set forth in claim 4, further comprising the step of arbitrarily selecting and setting any of said data to be read and stored from said portable telephone or said date to be fed back and again stored to said portable telephone.

* * * * *